(12) United States Patent  
Akuzawa

(10) Patent No.: US 6,394,205 B1
(45) Date of Patent: May 28, 2002

(54) CAR FOR AIDING OUTDOOR WALKING

(76) Inventor: Shojiro Akuzawa, No. 51, Higashikibogaoka, Asahi-ku, Yokohama-shi, Kanagawa-ken (JP)

(*) Notice: Subject to any disclaimer, the term of this patent is extended or adjusted under 35 U.S.C. 154(b) by 0 days.

(21) Appl. No.: 09/679,015

(22) Filed: Oct. 4, 2000

(30) Foreign Application Priority Data

Oct. 15, 1999 (JP) ............................................. 11-293089

(51) Int. Cl.[7] ................................................ B62D 51/04
(52) U.S. Cl. ...................................................... 180/19.3
(58) Field of Search ............................. 180/19.1, 19.2, 180/19.3, 65.1, 65.8, 332, 315

(56) References Cited

U.S. PATENT DOCUMENTS 2,399,605 A * 4/1946 Schroeder
2,645,297 A * 7/1953 Wennberg et al.
2,918,134 A * 12/1959 Jensen
3,791,474 A * 2/1974 Stammen et al.

FOREIGN PATENT DOCUMENTS

| JP | 5-7609 | 1/1993 |
| JP | 2000-157585 | 6/2000 |
| JP | 2000-217877 | 8/2000 |

* cited by examiner

Primary Examiner—Kevin Hurley
(74) Attorney, Agent, or Firm—Gifford, Krass, Groh, Sprinkle, Anderson & Citkowski, P.C.

(57) ABSTRACT

The objective of the present invention is to obtain a car for aiding outdoor walking without a danger of an uncontrollable run even when a user unexpectedly releases his grips, and to prevent the user from falling down due to a dragging movement of the car for aiding outdoor walking and to attain a good maneuverability for a user whose one hand is disabled when a user is in unstable posture due to stumbling etc. The car for aiding outdoor walking where a first, a second and a third controls are controlled by a gripping extent of a operating lever gripped together with a handle by the same hand according to a predetermined stroke schedule: the stroke extent of the first control is kept less than 40% of the whole stroke, the stroke extent of the third control is kept more than 70% and the stroke extent of the second control is kept between the first and the third controls.

4 Claims, 4 Drawing Sheets

CAR FOR AIDING OUTDOOR WALKING

BACKGROUND OF THE INVENTION

1. Field of the Invention

The present invention relates to a car for aiding outdoor walking equipped with a driving motor and provides measures against an uncontrolled run of the car for aiding outdoor walking.

2. Brief Description of the Related Arts

With regard to cars for aiding outdoor walking, the following examples were already disclosed.

Conventional Example 1

As an example of the motor driven cars for aiding outdoor walking, a motor driven car for aiding outdoor walking having a change-over switch equipped with driving and stop positions, where a user can walk by gripping a handle of the car for aiding outdoor walking. (See for example the registered Japanese utility model No. 3004035.)

Conventional Example 2

And there is another example of the power driven cars for aiding outdoor walking where a control box equipped with a power switch, a driving speed setting switch and a residual power indicator etc., is arranged at the center of a handle having grips at both ends and also a drive controlling device namely, accelerating levers which are maneuvered together with the grips so as to drive the car for aiding outdoor walking. (See for example the Japanese laid open utility model No. 7-11806.)

However, there are the following problems in the above-mentioned cars for aiding outdoor walking.

(1) in these examples, since the starting/stopping switch has to be manipulated by a different band from the one which grips the handle or the grip, or manipulated by the gripping hand after releasing grips due to the structure of cars for aiding outdoor walking, users of the cars for aiding outdoor walking instinctively grip handles or grips firmly when they are in unstable postures such as stumbling etc. Consequently, power switches can not be cut off immediately to stop the cars for aiding outdoor walking. Therefore there are probabilities for users to be dragged and to fall down due to uncontrolled running of the car for aiding outdoor walking.

(2) Due to the above-mentioned features in both examples, there are probabilities that these power driven cars for aiding outdoor walking would uncontrollably run during a switching operation by a person with a handicapped arm, since such operation is inconvenient for such person.

(3) Also due to the above-mentioned features in both examples, there are additional probabilities that these power driven cars for aiding outdoor walking run uncontrollably and cause accidents when a user releases his hands from the handle or the grips when the user's attention is attracted to other things, and the switches still remain in the "on" positions.

The objective of the present invention is to realize a danger-free car for aiding outdoor walking which reduces a user's physical burden, keeps and enhances a user's physical status by stimulating the user's intention to walk, where particularly the following functions are provided; (1) A protection against a fall down by the user as a result of being dragged by the car for aiding outdoor walking. When the user is in the unstable posture such as stumbling etc., a sudden standstill of the driving motor. (2) Start/stop operations of the driving motor can be manipulated with a single hand so that a person with a handicapped hand also can drive the car for aiding outdoor walking with his other hand. (3) A measure to stop the driving motor immediately, even when the user releases his grip on the handle unexpectedly.

SUMMARY OF THE INVENTION

A car for aiding outdoor walking according to the present invention having the following constitutions can solve the above-mentioned problems.

(1) A car for aiding outdoor walking equipped with a driving motor to drive wheels, a controlling measure where a first control is arranged to stop the driving motor, a second control is arranged to start the driving motor and a third control is arranged to stop the driving motor.

(2) A car for aiding outdoor walking according to (1) where the second control includes a controlling method of rotating velocity of the driving motor at a constant rate.

(3) A car for aiding outdoor walking according to (1) where the second control includes a controlling method of rotating velocity of the driving motor at a variable rate.

(4) A car for aiding outdoor walking where the first, the second and the third controls are controlled by an extent of gripping stroke of a user according to a predetermined stroke schedule: the extent of the first control is kept less than 40% of the whole stroke, the extent of the third control is kept more than 70% of the whole stroke and the extent of the second control is kept between the first and third controls.

DETAILED DESCRIPTION OF THE PREFERRED EMBODIMENTS

Hereinafter embodiments according to the present invention are described by referring to drawings.

Embodiment 1

Figure 1A:
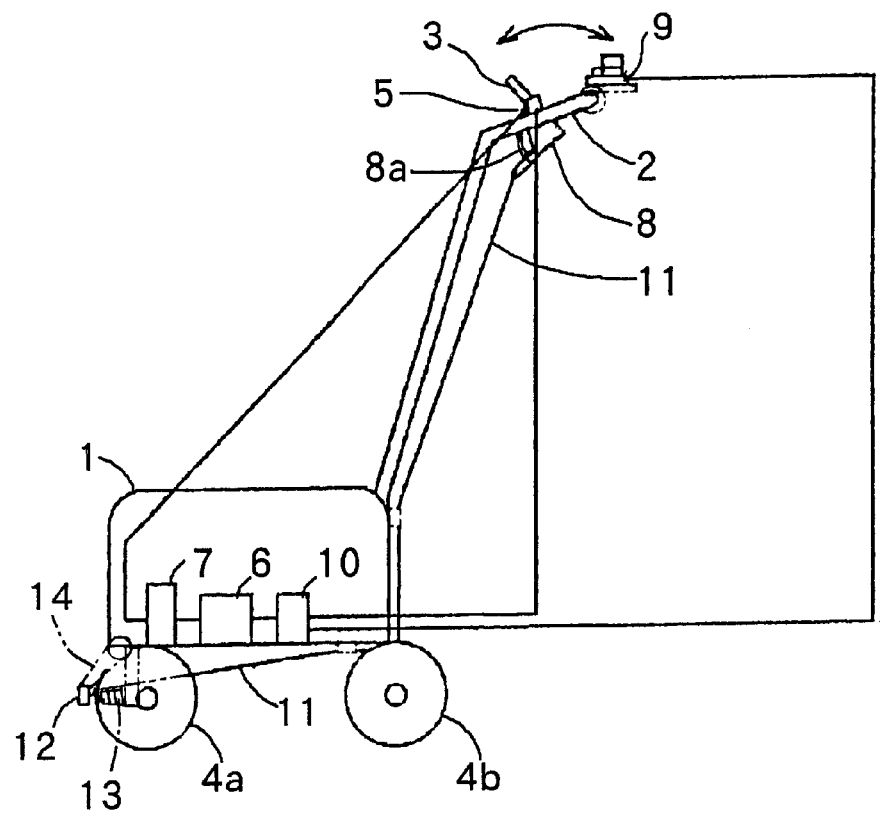
FIG. 1A is a side view of the car for aiding outdoor walking.
Figure 1B:
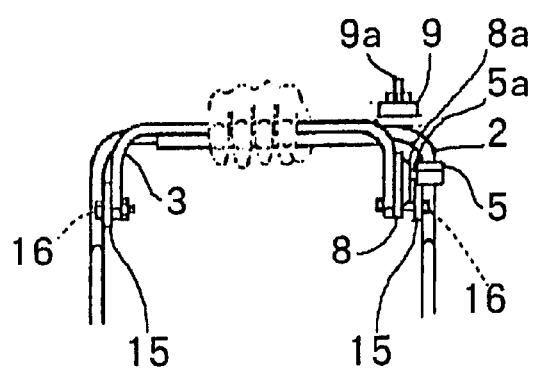
FIG. 1B is a front view of a handle and lever part and FIG. 1C is a plan view of a brake part of a car for aiding outdoor walking in the embodiment 1.
Figure 1C:
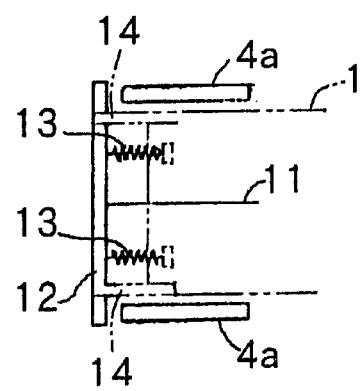
Figure 2A:
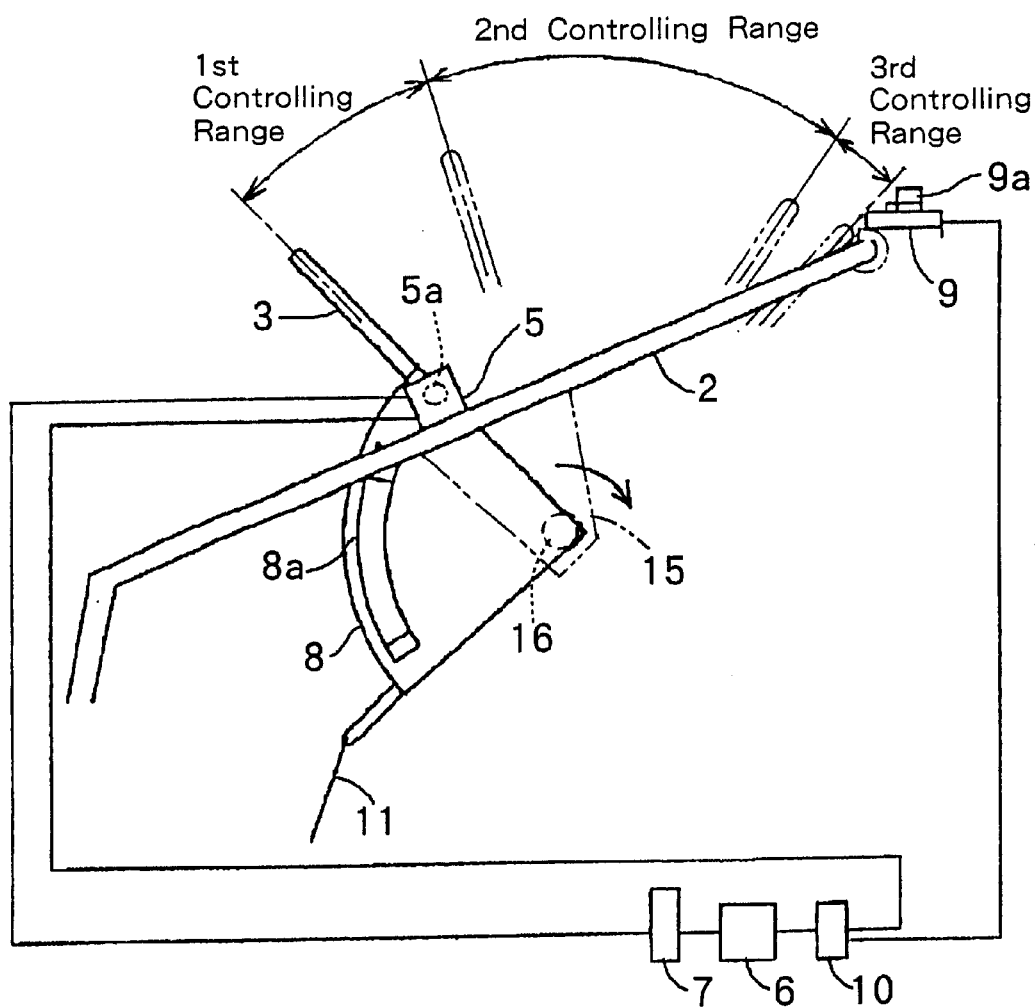
FIG. 2A shows an enlarged main portion in FIG. 1A
Figure 2B:
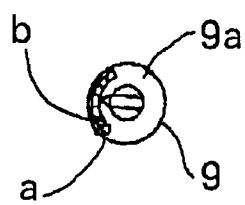
FIG. 2B is a plan view of a velocity selector switch.
Figure 3:
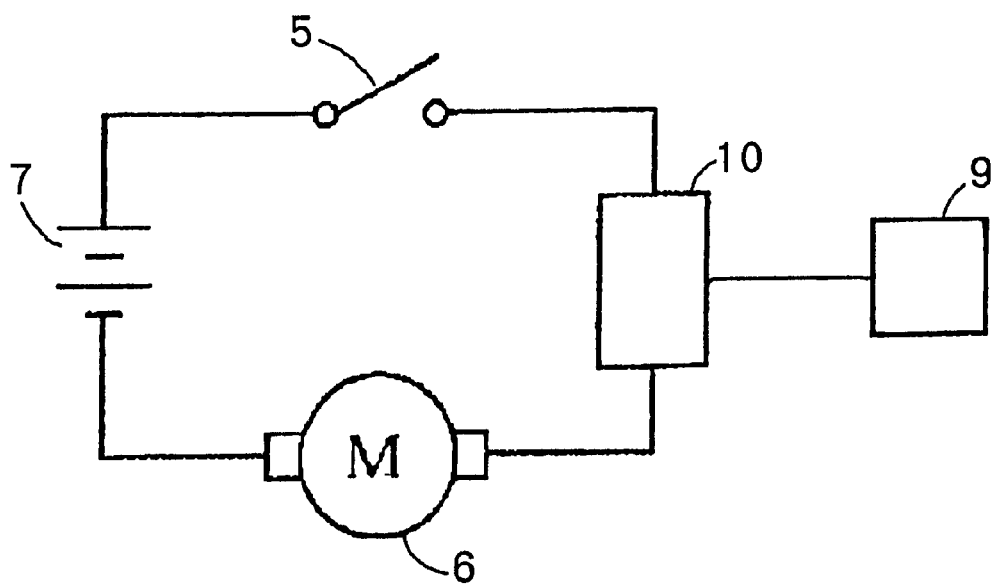
FIG. 3 is an electrical circuit diagram of a driving motor control of the car for aiding outdoor walking in the embodiment 1.

This embodiment is explained based on FIG. 1 to FIG. 3. As shown in FIG. 1A a chassis 1 has driving wheels 4a and casters 4b, and a handle 2 is fitted to a rear part of the chassis 1. A driving motor 6, a battery 7 and a motor controller 1C, are also arranged on the chassis 1. As shown in FIG. 1A, FIG. 1B and FIG. 2A the handle 2 is equipped with a motor switch 5, a velocity selector 9 and a bracket 15. An operating lever 3 is equipped with a switch guide 8 having a pressure contact 8a and the operating lever is rotatably fixed to the bracket 15 via a fixing axis 16. The switch guide 8 has a structure to rotate together with the rotation of the operating lever 3. As shown in FIG. 1A and FIG. 1C a brake 12 forming one-pieced member with an arm 14, fixed to a front lower part of the chassis 1 so as to rotate toward the driving wheel, is connected with a fixing member attached to the chassis 1 via springs 13. The car for aiding outdoor walking has a structure where the operational lever 3 is pushed back to an initial position depicted by a solid line in FIG. 2A via cable 11 when the brake 12 is pushed by the spring 13, As shown in FIG. 1A, FIG. 2A and FIG. 3 the switch 5, the motor controller 10, the driving motor 6 and the battery 7 are electrically connected with each other and the velocity selector 9 equipped with a velocity change-over switch 9a as shown in FIG. 2B is electrically connected with the motor controller 10 so as to send power signals corresponding to velocities, for example (a) 1 km/hour and (b) 1.5 km/hour, set by the velocity change-over switch 9a. Either a stepwise or a step-less type can be employed as the velocity selector 9. In stead of arranging the combination of the velocity selector 9 and the motor controller 10, the velocity selection of the car for aiding outdoor walking is attained by changing a velocity ratio via a power transmission mechanism which connects the driving motor 6 with the driving wheels 4.

As shown in FIG. 2A as a gripping stroke of the operating lever 3 gripped together with the handle 2 by the same hand is increased, a controlling status is changed from the first control up to a position just before a switch head 5a contacts with the a contact point 8a, then via the second control, a "switch-on" status, where the switch head 5a contacts with the contact point 8a, and to the third control, a "switch-off" status, where the switch head 5a does not contact with the contact point 8a so that the driving motor 6 stops and the brake 12 is pressed to the driving wheels 4a, and finally the control status returns to the first control when the operational lever 3 is released. In stead of rotating the lever and the switch guide, they can be operated linearly. A push-button switch for on/off operation or a pressure sensor such as piezoelectric module can be employed instead.

According to the constitution in this embodiment mentioned above, at first a suitable walking velocity for the user is selected by the velocity change-over switch 9a. When the user grips the operational lever 3 together with the handle 2 by the same hand, the control status is in the first control where the motor switch is off so that motor is at a standstill, namely the car for aiding outdoor walking of this embodiment is at a standstill. When the gripping stroke of the operational lever 3 is increased up to ca, 30% of the whole stroke, the control status goes into the second control. In the second control the motor switch is on so that the driving motor 6 is started by the power supplied from the battery 7. A rotating velocity of the driving motor 6 is controlled by the motor controller 10 to which a power signal is sent from the velocity selector 9. By transmitting rotating movement of the driving motor 6 to the driving wheels 4a via unshown sprocket and chain, the car for aiding outdoor walking runs at a velocity selected by the velocity change-over switch 9a. If the gripping stroke of the operational lever 3 is further increased, the car for aiding outdoor walking keeps running at the selected velocity until the gripping stroke goes into the third control. The gripping stroke goes beyond ce. 90% of the whole stroke when the operational lever 3 together with the handle 2 is gripped firmly and instinctively by the same hand due to the unstable posture such as stumbling etc., consequently the control status goes into the third control where the motor switch is cut off to stop the driving motor 6 and at the same time the brake is activated, thus the car for aiding outdoor walking is at a standstill immediately. If the grip on the operational lever 3 is released, the gripping stroke immediately returns to the first control by a dragging force from the spring 13 so that the motor switches off to stop the driving motor, thus the car for aiding outdoor walking is at a standstill.

Though appropriate stroke ranges for the first, the second and the third controls should be determined based on the characteristics, such as gripping force, response speed, tastes etc., of individual users, particularly, the first control should have enough range, since if the range is too narrow, the car for aiding outdoor walking starts unexpectedly, before the user is mentally and physically ready for operating the car for aiding outdoor walking. A maneuverability of the operational lever 3 becomes more flexible when the second control range is set wider. In the same sense as the first control, if the third control range is too narrow, there are probabilities particularly for users having a weak grips or a slow response abilities not to stop the driving motor 6 in time.

Taking the above-described possibilities into considerations, the preferable gripping stroke range of the operational lever 3 together with the handle using the same hand for each control is as follows: the stroke range of first control is less than 40% or so of the whole stroke, that of the third control is more than 70% or so and the stroke range of the second control is set in between.

Figure 4:
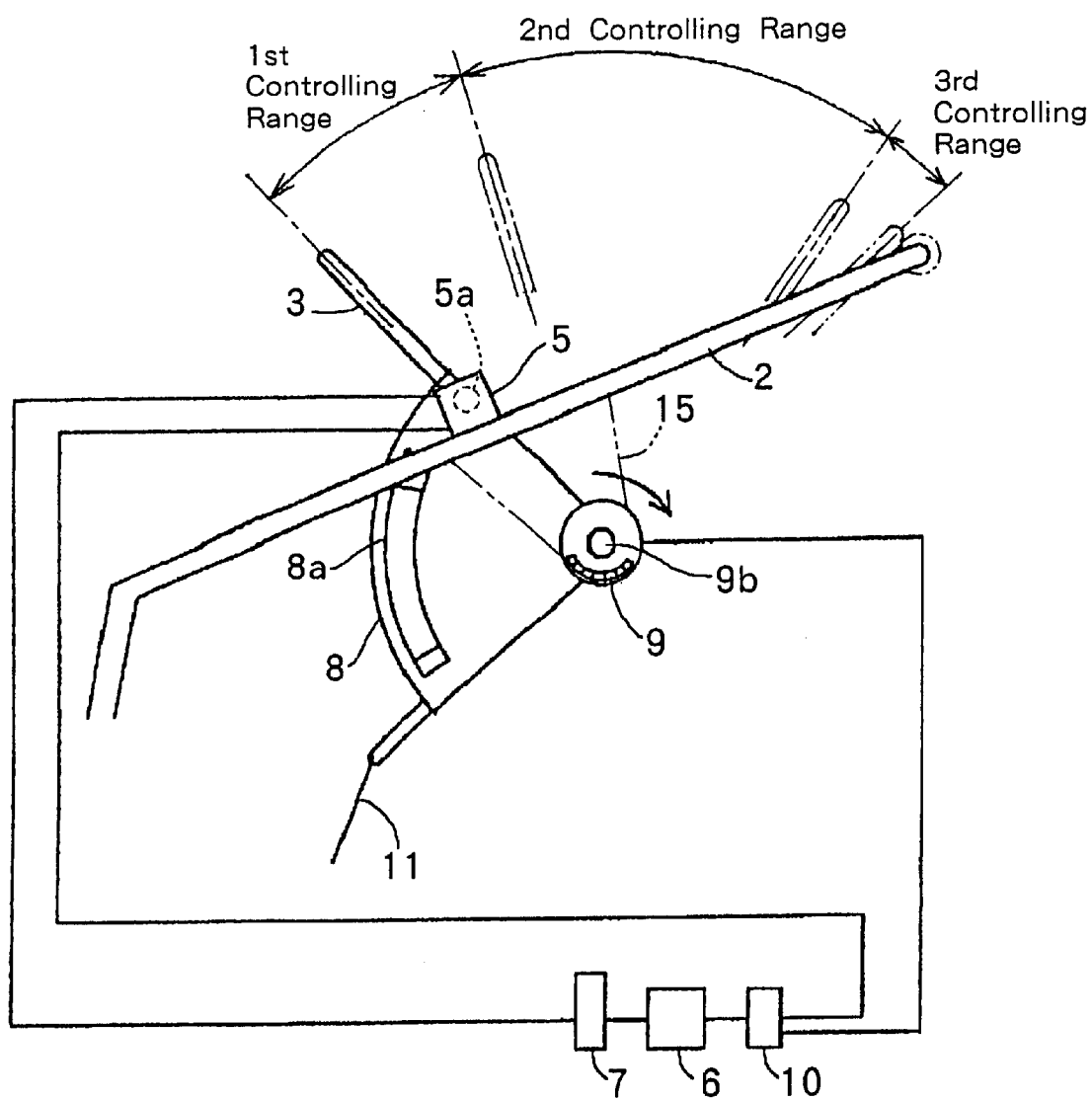
FIG. 4 shows an enlarged main portion of a car for aiding outdoor walking in the embodiment 2.

The embodiment 2 is explained by referring to FIG. 4. Except for a velocity selector 9, the embodiment 2 has the same constitution as the embodiment 1. As shown in FIG. 4 the velocity selector 9 is fixed to bracket 15 on the handle 2, where a change-over axis 9b, namely the axis of the selector also consists of the axis of the operational lever 3 and is fixed to the operational lever 3. The change-over axis 9b is arranged so as to rotate along with the movement of the operational lever 3.

Signals from the velocity selector 9 change in accordance with the rotating movements of the operational lever 3 so as to control rotational velocity of the driving motor variably via the motor controller 10. In the second control range the rotational velocity of the driving motor 6 can be variably controlled by a gripping extent of the operational lever 3 so that the user of the car for aiding outdoor walking can control the running velocity of the car for aiding outdoor walking variably by the gripping extent of the operational lever 3. The operational lever 3 and the velocity selector 9 can be arranged to move linearly instead of the rotational movement. On/off functions of the switch can be replaced by an electrical circuit arranged in the velocity selector 9.

(1) When the user who is in the unstable posture such as stumbling etc. consequently grips the operational lever together with the handle instinctively and firmly by the same hand, the driving motor comes to a standstill immediately so as to stop the car for aiding outdoor walking to avoid the user from falling down by a dragging movement of the car for aiding outdoor walking caused by the uncontrollable running of the car for aiding outdoor walking.

(2) Since starting/stopping the driving motor of the car for aiding outdoor walking can be operated by gripping the operational lever together with the handle by the same hand, a user whose one hand is disabled can operate safely without uncontrollable running of the car for aiding outdoor walking during switching operations.

(3) Since when the user unintentionally releases the operational lever, the driving motor comes to a standstill so as to stop running the car for aiding outdoor walking, accidents caused by the uncontrollable running of the car for aiding outdoor walking can be prevented.

(4) Since suitable running velocity of the car for aiding outdoor walking for individual users can be selected, it is useful for helping and enhancing rehabilitation for users and it also alleviates physical burdens of elderly or physically weak people during walking so that they can enjoy walking or shopping, thus the car for aiding outdoor walking is useful for those people to lead healthy, independent and full lives.

What is claimed is:

1. A car for aiding outdoor walking comprising: a driving motor to drive wheels and a controlling measure equipped with an operational lever where a first control is arranged to stop the driving motor, a second control is arranged to start the driving motor and a third control is arranged to stop the driving motor, wherein said controlling measure returns to said first control when a user of said car releases said operational lever and said controlling measure moves to said third control when the user firmly grips said operational lever such that said lever is moved against a handle of said car.

2. A car for aiding outdoor walking according to claim 1 where said second control includes a controlling method of rotating velocity of said driving motor at a constant rate.

3. A car for aiding outdoor walking according to claim 1 where said second control includes a controlling method of rotating velocity of said driving motor at a variable rate.

4. A car for aiding outdoor walking according to claim 1 where said first, said second and said third controls are controlled by a gripping extent of an operating lever gripped together with a handle by the same hand according to a predetermined stroke schedule: the stroke extent for said first control is kept less than 40% of the whole stroke, the stroke extent for said third control is kept more than 70% and the stroke extent for said second control is kept between said first and said third controls.

* * * * *